United States Patent Office 3,350,295
Patented Oct. 31, 1967

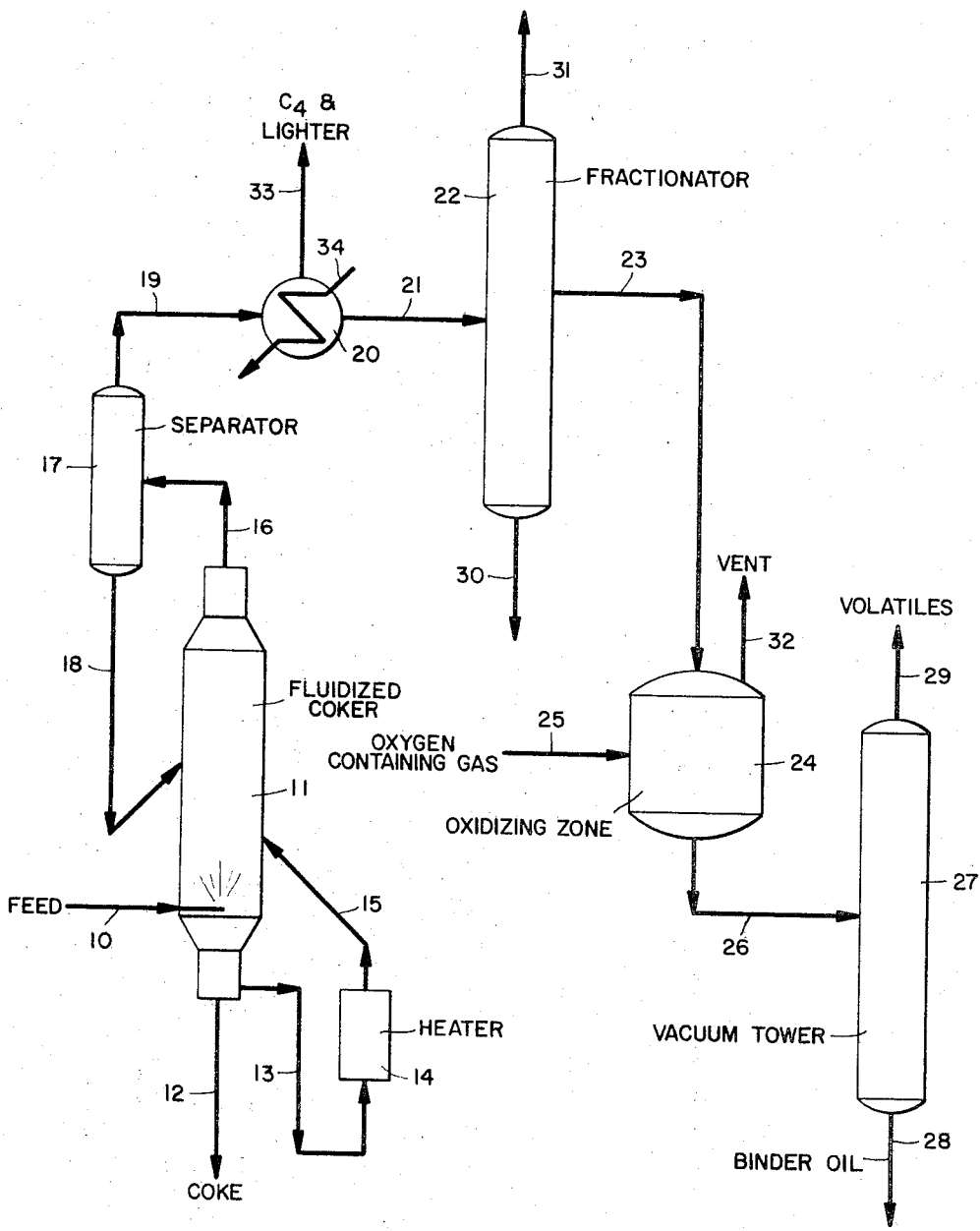

3,350,295
OXIDIZED BINDER PITCH FROM DEALKYLATED CONDENSED AROMATIC PETROLEUM FRACTIONS
Glen Porter Hamner, Baton Rouge, and Ralph Burgess Mason, Denham Springs, La., assignors to Esso Research and Engineering Company, a corporation of Delaware
Filed Dec. 28, 1965, Ser. No. 516,970
10 Claims. (Cl. 208—4)

ABSTRACT OF THE DISCLOSURE

Dealkylated petroleum feeds obtained by the dealkylation of petroleum tars or residual fractions are oxidized at relatively low temperatures, i.e., 200–650° F. to produce high yields of relatively high quality binder oil.

This invention relates to the preparation of carbonaceous binders for use in the preparation of carbon and graphite electrodes. More particularly, this invention relates to the preparation of binders for carbon particles prepared from dealkylated condensed aromatic petroleum fractions.

Carbon or graphite electrodes are produced from suitably hard carbonaceous materials such as calcined coke. The coke is calcined to remove volatile materials that tend to gas and cause porosity during subsequent baking operations. Calcining also serves to reduce shrinkage in the subsequent baking operations, thereby allowing closer control over the finished product. Since coke has no natural adhesiveness, it cannot be formed into a desired shape without the addition of a binder material, usually referred to as binder oils or pitches because of their consistency. Binder oil and coke are blended to form a green mix, the binder oil comprising about 10–40 wt. percent of the mix, depending upon the type of electrode desired. Lower amounts of binder oil, e.g., 10–25 wt. percent, are utilized in blends for the prebaked electrode, which is molded at temperatures of about 1800–2200° F. under pressures of 300–1000 p.s.i.g. for periods of time ranging up to 30 days, before use. The Soderburg electrode, utilizes about 15–40 wt. percent binder oil in the blend to increase the plasticity of the mix. The Soderburg electrode is formed by feeding the green mix to the top of an electrolytic cell, and using the heat of the cell, e.g. 1700–1900° F., to bake the electrode as the mix moves downward due to electrode consumption.

The binder material cements the coke particles together by forming a binder coke, at the baking temperatures, between the particles of calcined coke which comprise the bulk of the mixture. Therefore, it is essential that the binder oil have properties consistent with the properties of the calcined coke. Inferior binder materials lead to dusting of the electrodes, i.e. rapid consumption of the binder material causing loose particles of the calcined coke to fall free of the electrode. Electrode dusting may lead to short-circuiting of an electrolytic cell, but more important, represents coke not used in the operation, thereby increasing operating costs. This dusting tendency is greatly reduced in electrodes with a dense structure. To achieve a dense, low porosity structure, strict specifications have been imposed upon the quality of the binder material. These specifications have been empirically developed, some of the more important factors being: coking properties, softening point, aromatic hydrogen to methylene hydrogen ratio and carbon to hydrogen atomic ratio.

A measure of coking properties is obtained in accordance with the procedure set out in ASTM–D189, for determining the Conradson carbon number (wt. percent carbon residue after destructive distillation of a sample binder material). High Conradson carbon numbers are required for satisfactory binders, e.g. 50 or above. The Conradson carbon number must be high when the binder oil is in a satisfactory softening point range. Softening point is determined in accordance with ASTM–D36–62T (temperature at which a steel ball of specified size will fall through a premeasured sample of the pitch in a steel ring suspended in glycerine) and should be within the range of about 180–290° F. A pitch with a softening point below 180° F. does not provide sufficient physical binding force, causing the electrode to lose shape. A pitch with softening point above about 290° F. does not impart sufficient plasticity to the blend, thus precluding formation of the desired shape. Pitches in the lower end of the softening point range are called soft pitches, while those in the higher end of the range are called hard pitches.

To summarize, the desired binder material is one that will lead to satisfactory electrodes and compactions, has a Conradson carbon number of at least 50, a softening point in the range 180–290° F., and further characterized by relatively high percentages of benzene insoluble and quinoline insolube material, indicative of a high molecular weight binder oil. A further characteristic of a suitable binder oil is a high degree of aromaticity and a low amount of methylene hydrogen. Methylene hydrogen must be kept at a minimum since baking, as in electrode formation, releases surplus hydrogen, i.e. represented by methylene groups, and causes excessive gassing. Gas formation prevents the electrode from attaining the desired density for both electrical conductivity and strength. For this desired condition of high aromaticity with low methylene hydrogen the atomic ratio of carbon to hydrogen must be high. A recently developed method for determining the aromatic hydrogen to methylene hydrogen ratio by infrared techniques, however, provides a more reliable measure for predicting binder material performance than the carbon to hydrogen atomic ratio. The process of this invention provides an aromatic hydrogen to methylene hydrogen ratio of greater than 2, a considerable improvement over previously used binder materials.

In the past, almost exclusive use was made of coal tar pitch (obtained by distillation of coal tar) as the binder material in the manufacture of carbon products, e.g. electrodes. Petroleum pitches usually did not possess the requisite properties for use as binder materials. For example, petroleum pitches with satisfactory Conradson carbon numbers were found to have higher than satisfactory softening points. Conversely, petroleum pitches with satisfactory softening points did not possess high enough Conradson carbon numbers. Further, petroleum pitches generally did not contain appreciable benzene and quinoline insolubles. Consequently, although highly aromatic tars resulting from cracking processes appeared potentially attractive, such tars failed to result in satisfactory pitches for use as binder materials. Electrodes produced from petroleum pitches were uneven in mechanical strength and had poor conductivity.

Recently, several processes for preparing binder materials from petroleum tars have been developed that produce satisfactory binders. These processes deal generally with additional thermal treatment of the petroleum tar and recovery of a binder oil fraction from the treated feedstock. However, a serious disadvantage inherent in these processes, was the rather low yields of binder oils. Since petroleum fractions are readily available and inexpensive, it is also desirable to produce binder materials from residues not previously considered suitable for use as binder material feedstocks.

It is one object of the present invention, therefore, to provide a process wherein a pitch, suitable for use as a binder material, may be prepared from petroleum fractions. It is another object of this invention to provide a process whereby the yield of binder oils from known feedstocks may be substantially increased. It is yet another object of this invention to provide a process for preparing a pitch, suitable for use as a binder material, from feedstocks previously thought unsuited for binder oil preparation.

In accordance with the process of this invention high yields of an 800° F.+ binder pitch having more than three condensed aromatic rings may be obtained by treating a suitable feedstock, i.e. a dealkylated condensed aromatic petroleum gas oil or residual fraction, preferably boiling in the range of 400–800° F. with an oxygen-containing gas at relatively low temperatures of 200–650° F., under pressures ranging from atmospheric to 500 p.s.i.g., for periods of time ranging from 1–24 hours, such that the final binder pitch has an oxygen content of 0.1–1.5 wt. percent. Volatile products may be stripped out of the pitch of yield a binder material in excess of 90% based on the feed to the oxidation step. The practice of this invention may also result, depending upon the type of dealkylated feedstock utilized, in increasing binder pitch yields by 100–200% from known feedstocks, or in producing binder pitch from feedstocks previously thought to be unsuited for such use.

It is surprising to find that conducting the oxidation at such low temperatures yields a binder oil of such high quality. The feedstocks applicable to the present invention are known to undergo dehydrogenation and polymerization when heated in the presence of oxygen. However, the role played by oxygen in polymerization of aromatic rings is not completely understood. Therefore, the result that high quality binder oils could be produced by treatment of a 400–800° F. boiling range condensed aromatic petroleum fraction with an oxygen-containing gas stream at temperatures of 200–650° F., as contrasted with previous processes that required heating above about 725° F., was quite unexpected. At temperatures above 725° F. the presence of oxygen promotes polymerization and dehydrogenation leading to the formation of substantial amounts of coke. Conversely, it is known that depolymerization can be achieved at elevated temperatures only if oxygen is completely excluded. Not wishing to be bound by any particular theory, it is believed that the condensation of aromatics experienced in the instant invention is a result of polymerization reactions of an entirely different order as compared to those leading to coke formation at higher temperatures. As a consequence, there is no coke formation during the oxidation step of this process. Further, it is believed that dehydrogenation does not occur or occurs only to a minor extent, at the temperatures used in the oxidation process. Moreover, with dealkylated aromatic nuclei, the low temperature oxidation is directed towards aromatic condensation (or polymerization) rather than oxidation of alkyl side chains. Also, by virtue of utilizing a dealkylated feedstock more sites are available in the molecular structure for the necessary aromatic condensation reactions.

Since this invention is predicated, in part, upon improving binder oil yields from known feedstocks, the feedstocks which are subjected to dealkylation may be broadly characterized as aromatic petroleum fractions boiling above about 450° F. and preferably in the range of 550–1000° F. These feedstocks may be derived from steam or catalytic cracking of gas oils or mixtures of gas oils with heavy or light cycle stocks, clarifier oils, steam cracking of gas oils or naphthas, phenol extracts from relatively aromatic distillates, and the like.

Examples of feedstocks suitable for dealkylation and subsequent use in this invention include heavy virgin residual oils which form the bottoms fraction in the distillation of topped crude oil. The heavy virgin residual oils are obtained by delivering the topped crude oil from an atmospheric tower in which, for example, furnace oils and lighter fractions have been removed, to a vacuum tower. A distillate gas oil suitable for use as a catalytic cracking charge stock is discharged from the top of the vacuum tower and a bottoms fraction containing the heavy virgin residual oils is delivered from the bottom of the tower. These fractions include oils boiling above 1000° F.

Another suitable feedstock includes the bottoms fraction obtained from the distillation of cracked oil produced by the catalytic cracking of petroleum gas oils. Cracking is carried out in the presence of catalysts, such as silica-alumina catalysts, which are normally employed in the fluidized state. The cracked oil product is then distilled, the bottoms fraction being transferred to a slurry settler for catalyst recovery. The remaining oil is a suitable feedstock for the process of this invention.

Other petroleum fractions available from either thermal or catalytic cracking may be utilized as feeds to a steam cracker for production of suitable feeds for this invention. The bottoms fraction of a fractionator of steam cracked products is a suitable feed for this process. This bottoms fraction includes those fractions boiling above 650° F.

A particularly preferred feed is the petroleum residue from mid-boiling fractions processed in the following manner: (1) catalytic cracking of a mid-boiling petroleum fraction in which naphthas and isoparaffins are largely converted; trace impurities, such as nitrogen, sulfur and metals, are removed; (2) the resulting product is steam-cracked at about 1200–1500° F. wherein straight chain paraffins are converted for use as basic chemical raw materials; (3) high boiling aromatics and condensation products (i.e. a residual fraction boiling above about 900° F.) are recovered as tar from the steam cracker and used as a feedstock for dealkylation. Preparation of this feed is fully described in copending application Ser. No. 457,318, filed May 20, 1965 by Glen P. Hamner, which forms no part of this invention.

Another particularly preferred feedstock is the tar bottoms fraction obtained from the distillation of cracked oil produced by steam cracking light or heavy catalytic cycle oils at 1200–1500° F. The tar material from the steam cracker is distilled at temperatures below about 650° F. under pressures of 5–20 p.s.i.g. The residue, highly aromatic tar bottoms, of the distillation process may be employed as a particularly suitable feedstock for dealkylation.

A feedstock previously considered unsuitable for conversion to binder oils, such as sulfur dioxide or furfural extracts of light cycle oils or 450–550° F. fractions from the product of catalytically cracked gas oil, may also be converted to binder oil by the process of this invention.

Dealkylation can be carried out by any one of the several processes known to the art. However, in order to produce the best quality binder oil, dealkylation should preferably be such that 90% or more of the alkyl side chains of the aromatic feedstocks are removed. Examples of dealkylation processes follow: others will be obvious to those skilled in the art.

Hydrodealkylation may be carried out thermally e.g. at temperatures of 1200–1350° F. under pressures of 100–600 p.s.i.g., while feeding hydrogen to the reaction chamber. The thermal hydrodealkylation process is particularly suitable since it may result in the removal of up to 95% of the alkyl groups and leads to the formation of high boiling aromatic condensation products.

Catalytic hydrodealkylation, which may be carried out at temperatures and pressures as low as 500° F. and atmospheric respectively as well as under the conditions for thermal hydrodealkylation, may also be used to prepare a dealkylated aromatic fraction suitable for conversion to superior pitch binder oil by the low temperature oxidation treatment of this invention. However, the dealkylation is not as complete as in thermal hydrodealkylation. The catalytic process utilizes catalysts such as nickel or cobalt or silica-alumina, aluminum phosphate and combinations of silica-alumina and aluminum phosphate. Hydrogen is fed to the reaction zone as in the thermal process, e.g. at about 7–8 moles hydrogen per mole aromatic.

Pyrolysis of light cycle oils (400–480° F.) at 1550–1650° F. yields 50–80% dealkylated aromatics and high boiling condensation products which may also be used as feeds to the oxidation step after recovery of a 400–800° F. fraction.

A preferred method of dealkylation is that described in copending application Ser. No. 517,011, filed of an even dated by Glen P. Hamner. This dealkylation process is summarized as follows: (1) a feedstock suitable for dealkylation, particulary those mentioned above, is introduced to a fluidized coker operating at temperatures of 1300–1600° F.; (2) the vaporous dealkylated feedstock is recovered free of finely divided coke and carbon residue which are removed and recycled to the coker; (3) the dealkylated product is condensed and lighter boiling hydrocarbon gases, e.g. $C_4$ and lighter, are flashed off; (4) the liquid product from the condenser is fractionated to recover about 30% binder oil, about 60% mid-range aromatic petroleum gas oil (450–800° F.), and about 10% of $C_5$–450° F. materials; (5) the mid-range aromatic petroleum gas oil fraction (450–800° F.) is then subjected to the low temperature oxidation process. Aromatic condensation to 2 and 3 ring condensed fractions takes place in steps (4) and (5).

A minor amount of binder oil may be recovered from the above-mentioned dealkylated feedstocks. However, a major portion of the dealkylated feedstock must be relegated to other uses. For example, dealkylated heavy catalytic cycle oil will yield approximately 30 wt. percent binder oil (based on the liquid dealkylated feed to a fractionating column) boiling above about 800° F.; but, approximately 60 wt. percent of the product is condensed dealkylated polynuclear aromatics boiling in the range of about 400–800° F. that when subjected to the oxidation process of this invention will yield substantially equivalent amounts of an 800° F. + pitch suitable for use as a binder oil.

After removal of the binder oil, light gases and hydrocarbons, the remaining dealkylated product may be characterized as a dealkylated condensed aromatic petroleum fraction. This petroleum fraction boils preferably in the temperature range 400–800° F., but fractions boiling outside this range are also applicable. The 400–800° F. boiling range dealkylated condensed aromatic fraction is then subjected to the low temperature oxidation step of this invention.

The dealkylated condensed aromatic fraction boiling in the range 400° F.–800° F. will normally contain 2–3 condensed ring aromatic components. These are most suited for conversion to binder pitch by the process of this invention since they afford an adequate number of sites for further aromatic condensation (polymerization) to form components having more than 3 condensed aromatic rings. Although it is possible to use fractions boiling outside this range, e.g. 300° F., it becomes more difficult to control the oxidation (polymerization) step.

Aromatic condensation of any of the dealkylated feedstocks may be easily accomplished, i.e. at temperatures of 500° F–800° F. for periods of 1–6 hours, depending upon the feedstock utilized. The condensation may be carried out in a condensing vessel, by maintaining a high reflux ratio for the range of material desired for oxidation, or in any suitable manner.

Although the present invention will be described with reference to steam cracked aromatic gas oil, it is to be understood that any suitable feedstock will react in the same way. Further, the dealkylated feedstock is shown as being prepared by the preferred process of fluidized coke bed dealkylation, but should not be limited to this method.

FIGURE 1 is a schematic flowplan for the production of pitch suitable for use as a binder oil by the process in accordance with the present invention.

Turning now to FIGURE 1, an aromatic gas oil (550° F.–800° F.) that has been processed by catalytic and/or steam cracking operations is introduced by line 10 to dealkylation zone 11. Dealkylation zone 11 is preferably a fluidized coke bed operating at temperatures of about 1300–1600° F. under pressures of about 0–100 p.s.i.g. and a residence time of about 0.1–10 seconds. The fluidized coke bed is heated by cycling a portion of the coke by way of line 13, heater 14, and line 15 and back to coker 11. The coke is heated in heater 14 by burning part of the coke or by burning a hydrocarbon fuel to heat the coke. Excess coke formed during the dealkylation is removed by line 12 and may be used for fuel, etc. A dealkylated vaporous product mixture is removed from coker 11 by line 16, transferred to a separator 17, wherein carbonaceous particles entrained in the product mixture are removed and recycled, if desired, to coker 11 through line 18. Separator 17 may be a cyclone separator or equivalent. The vaporous product mixture is then transferred via line 19 to condenser 20, operating at about 500–800° F., steam from line 34 being used to cool and condense the vaporous product mixture. The dealkylated product remains in the condenser until substantially all of the vaporous products above $C_4$ are condensed. $C_4$ and lighter hydrocarbons are vented off by way of line 33. Aromatic condensation to 2 and 3 ring products also takes place in condenser 20. In an alternate embodiment, steam or quench oil or both may be directly injected into the product mixture to cause condensation. The condensed aromatic-dealkylated product is then passed to fractionating column 22 by way of line 21. Fractionating column 22 is normally operated at a bottoms temperature of about 650–900° F. Further, aromatic condensation may take place in the reboiler (not shown) of column 22. In one version of this invention all of the aromatic condensation may take place in the reboiler by maintaining a high reflux ratio from reboiler to column; thus, eliminating the necessity for the condenser. An overhead product of $C_5$–430° F. is withdrawn for use as chemical raw materials, by way of line 31. The bottoms product, withdrawn by line 30 may be used for binder oil. A mid-range dealkylated condensed aromatic petroleum fraction of about 430–800° F., boiling range is withdrawn by line 23. This fraction was previously used for process recycle or chemical raw materials. However, this fraction can now be converted to substantially equivalent amounts of binder oil. The 430–800° F. fraction is fed to an oxidizing zone 24 operating at about 200–650° F., preferably 300–400° F., under pressures of about atmospheric to 500 p.s.i.g. Into oxidizing zone 24, by way of line 25, is fed an oxygen-containing gas, in which the oxygen content ranges from about 1–21%. The oxygen-containing gas is introduced at superatmospheric pressures. Oxidation takes place for about 1 to 24 hours, flow rates or holdup tanks being adjusted to suit this operation, or until an oxygen uptake by the feed stock of at least 0.1% occurs. Light gaseous and water reaction products, low boiling unconverted feed and inert gases from the oxygen-containing gas stream are removed through vent line 32. The oxidized pitch product containing about 0.1 to 1.5 wt. percent oxygen, and preferably 0.5–1.0 wt. percent oxygen, along with some volatile materials is removed by way of line 26 and may be used as a satisfactory binder material.

However, in a preferred embodiment of this invention, the product of the oxidizing zone is delivered by line 26 to a vacuum distillation tower 27, operating at pressures of about 10–15 p.s.i.g. Fractions boiling at 750° F. and lower temperatures are removed as distillate products from tower 27, via line 29, and the pitch product is discharged as a bottoms product through line 28. The flash temperature in tower 35 is controlled such that the overhead vapors range from about 725° F. up to about 800° F. The maximum flash temperature in the tower is somewhat critcial since it is used to obtain the specific softening point desired in the final binder product.

In carrying out this invention, the oxygen is introduced into oxidizing zone 24 as an oxygen-gas stream, of which the following mixtures are illustrative: air, oxygen-nitrogen, oxygen-argon, oxygen-carbon monoxide, oxygen-carbon dioxide, oxygen-containing flue gases, and the like. Of the foregoing, air and air-inert gas mixtures, e.g. flue gas, are preferred; the former because of its ready availability, the latter because it is a partial source of heat. The rate at which the oxygen-containing gas stream is fed to the oxidizing zone is not at all critical and may vary widely with the availability of the gas to be utilized. The important variable is the oxygen content of the resultant oxygenated dealkylated condensed aromatic petroleum product (binder pitch). Oxygen content of less than 0.1 wt. percent will yield inferior binder pitch or more than 1.5 wt. percent will result in substantial coke formation. Additionally, stocks that undergo a short oxidation period will result in lesser amounts of binder pitch, while longer periods of oxidation will result in greater amounts of binder pitch. Consequently, the amount of volatiles stripped out in the vacuum tower will increase with decreasing oxidation time, and will decrease with increasing oxidation time. If of sufficient quantity, the volatile materials may be recycled to the oxidation zone for further treatment.

The following examples further serve to illustrate the process of this invention and are not to be construed as limiting it in any way.

*Example 1*

A feedstock comprising steam cracked tar from the distillation of heavy catalytic cycle oil having the following properties:

| | |
|---|---|
| Gravity, ° API @ 60° F. | −4.4 |
| Viscosity, SSU @ 130° F. | 2078 |
| Viscosity, SSU @ 210° F. | 120 |
| Flash, Cleveland Open Cup, ° F. | 370 |
| Conradson carbon, wt. percent | 16.1 |
| Benzene insolubles, wt. percent | Nil |
| Oxygen, wt. percent | <0.1 |
| Sulfur, wt. percent | 0.7 |
| ASTM Distillation (D–1160), percent: | |
| 5 | 521 |
| 50 | 745 |
| 70 | 845 |
| Nickel and vanadium, p.p.m. | <2 | was charged to a fluidized coker at a rate 1000 ml./hr. to dealkylate the feed stock. The coker was operated at 1450° F., 8 p.s.i.g., and a feed residence time of 1–3 seconds. Nitrogen flowing at a rate of 50 cf./hr. was used as a fluidizing gas. Condensation at 700° F. for about 4 hours yielded a dealkylated product of 16.2 wt. percent $C_4$ and lighter gases, 47.4 wt. percent 400° F.+ liquid, and 36.4 wt. percent coke and carbon black obtained. The liquid product was fractionated and 68.6 wt. percent dealkylated condensed aromatic gas oil (430–800° F.) was obtained. The gas oil was oxidized with air at 300–350° F. under atmospheric pressure for 16 hours, to obtain a pitch with the properties shown in Table I.

TABLE I.—PETROLEUM BINDER OIL

| | |
|---|---|
| Softening point, °F. | 200 |
| Conradson carbon, wt. percent | 46 |
| Coking value, wt. percent | 50 |
| Acetone insolubles, wt. percent | 24.6 |
| Benzene insolubles, wt. percent | 18 |
| Quinoline insolubles, wt. percent | 3.3 |
| Oxygen, wt. percent | 1.1 |
| Carbon, wt. percent | 92.64 |
| Hydrogen, wt. percent | 4.63 |
| Sulfur, wt. percent | 1.22 |
| Aromatic hydrogen/methylene hydrogen | 3.7 |
| Yield of binder oil, percent | 90 |

This binder oil was further stripped by vacuum distillation to a 90 wt. percent yield of binder oil having a 255° F. softening point and a Conradson carbon of 56; indicating that the physical properties of the binder oil may be adjusted by the removal of low boiling components.

*Example 2*

To demonstrate the necessity of dealkylating the aromatic tar feed prior to oxidation, the aromatic tar feed to the dealkylation step was oxidized to approximately same binder oil yield, the binder product of the instant invention is compared with nondealkylated aromatic tar feed and the oxidation product of this feed.

| | Feed | | |
|---|---|---|---|
| | Steam Cracked Tar | | Steam Cracked Tar Dealkylated |
| Process | Distillation | Oxidation | Oxidation |
| Binder Oil Yield, wt. percent | 45 | 90 | 100 | 90 |
| Binder Oil Inspections: | | | | |
| Softening Point, °F | 230 | 225 | 200 | 255 |
| Conradson Carbon, wt. percent | 34 | 40 | 46 | 56 |
| Oxygen, wt. percent | 0.04 | 1 | 1.1 | 1.1 |
| C, wt. percent | 92.61 | 92.61 | | 92.64 |
| $H_2$, wt. percent | 6.43 | 6.43 | | 4.63 |
| C/H Atomic Ratio | 1.2 | 1.39 | | 1.67 |
| Aromatic H/Methylene H | 0.38 | 0.83 | | 3.7 |
| Sulfur | 1.1 | 1.0 | | 1.2 |

A specification binder product of improved Conradson carbon value for a given softening point, higher carbon content and lower methylene hydrogen (gas precursors during calcination) is realized by dealkylation of the aromatic tar feed.

*Example 3*

The quality of the binder oil described in the foregoing examples, prepared by the prescribed sequence of dealkylation and oxidation is demonstrated by comparison with the target levels for binder oil from coal tar. The comparison is:

| | Product | |
|---|---|---|
| Product Inspections | Steam Cracked Tar Dealkylated, Oxidized and Stripped | Coal Tar Binder Target |
| Softening Point, °F | 255 | 200–260 |
| Conradson Carbon, wt. percent | 56 | 50–58 |
| Carbon, wt. percent | 92.64 | 92–93 |
| Hydrogen, wt. percent | 4.63 | 4–4.5 |
| Sulfur, wt. percent | 1.2 | 1.00 |
| Nitrogen, wt. percent | 0.0 | 1.00 |
| Oxygen, wt. percent | 1.1 | 1–2 |
| Ash, wt. percent | 0.003 | 0.03 |
| C/H, Atomic Ratio | 1.67 | 1.7–1.9 |
| Aromatic/Methylene Hydrogen | 3.7 | (*) |

*Concept recently employed and generalized value has not been established but some of the better coal tar pitches are known to have a value of 1.8.

What is claimed is:

1. A process for preparing a binder pitch from an aromatic petroleum fraction feed stock selected from the group consisting of cracked petroleum gas oils and residual fractions boiling above about 450° F. which comprises dealkylating the feed stock in a fluidized coke bed to remove at least 90% of the alkyl side chains from the aromatic components of the feed stock; recovering a dealkylated vaporous product mixture from the fluidized coke bed; converting a portion of the product mixture to a condensed aromatic petroleum fraction; fractionating the product mixture to obtain a dealkylated condensed aromatic petroleum fraction boiling in the range of about 400–800° F.; oxidizing the dealkylated condensed aromatic petroleum fraction in an oxidizing zone at 200–650° F. with an oxygen containing gas having an oxygen content of 1–21% for a period of 1–24 hours and sufficient to make the oxygen content of the dealkylated aromatic petroleum fraction 0.1–1.5 wt. percent thereby converting the dealkylated aromatic petroleum fraction to pitch and more volatile products; withdrawing from the oxidizing zone the pitch and the more volatile products; stripping the pitch of substantially all the more volatile products; and, recovering a binder pitch product boiling above 800° F.

2. The process of claim 1 wherein the feed stock boils in the range 550–1000° F.

3. The process of claim 1 wherein the temperature of the oxidizing zone ranges from about 300–400° F.

4. The process of claim 1 wherein the oxygen content of the dealkylated condensed aromatic petroleum fraction is 0.5–1.0 wt. percent.

5. The process of claim 1 wherein the binder pitch product contains more than 3 condensed aromatic rings.

6. The process of claim 1 wherein the feed stock comprises a petroleum tar fraction resulting from the steam cracking of a heavy catalytic cycle oil.

7. The process of claim 1 wherein the aromatic condensation is effected at temperatures of about 500–800° F. for about 1–6 hours.

8. A process for preparing a binder pitch from an aromatic petroleum fraction feed stock selected from the group consisting of cracked petroleum gas oils and residual fractions boiling in the range 550–1000° F. which comprises dealkylating the feed stock in a fluidized coke bed to remove at least 90% of the alkyl side chains from the aromatic components of the feed stock; recovering a dealkylated vaporous product mixture from the fluidized coke bed; converting a portion of the product mixture to a condensed aromatic petroleum fraction at 500–800° F. for 1–6 hours; fractionating the product mixture to obtain a dealkylated condensed aromatic petroleum fraction boiling in the range 400–800° F.; oxidizing the dealkylated condensed aromatic petroleum fraction in an oxidizing zone at 200–650° F. with an oxygen-containing gas having an oxygen content of 1–21% for a period of 1–24 hours and sufficient to make the oxygen content of the dealkylated condensed aromatic petroleum fraction 0.1–1.5 wt. percent, thereby converting the dealkylated condensed aromatic petroleum fraction to pitch and more volatile products; withdrawing from the oxidizing zone the pitch and the more volatile products; stripping the pitch of substantially all the more volatile products; and, recovering a final binder pitch product boiling above 800° F.

9. The process of claim 8 wherein the aromatic petroleum fraction is dealkylated at a temperature of 1300–1600° F. in the fluidized coker.

10. The process of claim 8 wherein the feed stock comprises a petroleum tar fraction resulting from the steam cracking of a heavy catalytic cycle oil.

References Cited

UNITED STATES PATENTS

| | | | |
|---|---|---|---|
| 2,893,946 | 7/1959 | Brown | 208—127 |
| 2,991,241 | 7/1961 | Renner | 208—6 |
| 3,145,238 | 7/1964 | Kestner | 260—672 |
| 3,162,593 | 12/1964 | Persyn | 208—127 |

DANIEL E. WYMAN, *Primary Examiner.*

P. E. KONOPKA, *Assistant Examiner.*